United States Patent
Tojo et al.

(10) Patent No.: US 11,975,652 B2
(45) Date of Patent: May 7, 2024

(54) NOTIFICATION DEVICE

(71) Applicant: Isuzu Motors Limited, Tokyo (JP)

(72) Inventors: Tomokazu Tojo, Fujisawa (JP); Hiroshi Yano, Fujisawa (JP); Masahiro Seki, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 0 days.

(21) Appl. No.: 17/795,554

(22) PCT Filed: Jan. 29, 2021

(86) PCT No.: PCT/JP2021/003348
§ 371 (c)(1),
(2) Date: Jul. 27, 2022

(87) PCT Pub. No.: WO2021/153769
PCT Pub. Date: Aug. 5, 2021

(65) Prior Publication Data
US 2023/0073562 A1 Mar. 9, 2023

(30) Foreign Application Priority Data
Jan. 30, 2020 (JP) .............................. 2020-013522

(51) Int. Cl.
*B60Q 9/00* (2006.01)
*G08G 1/16* (2006.01)
(52) U.S. Cl.
CPC ............ *B60Q 9/008* (2013.01); *G08G 1/167* (2013.01)

(58) Field of Classification Search
None
See application file for complete search history.

(56) References Cited

U.S. PATENT DOCUMENTS

| | | | | |
|---|---|---|---|---|
| 5,757,472 A | * | 5/1998 | Wangler | G01S 7/4817 356/612 |
| 7,233,233 B2 | * | 6/2007 | Taniguchi | G06V 40/10 348/148 |
| 9,507,413 B2 | * | 11/2016 | Gee | B60K 37/06 |
| 11,268,826 B2 | * | 3/2022 | Sakurada | G01C 21/3461 |
| 2011/0228980 A1 | * | 9/2011 | Ichikawa | H04N 7/181 382/103 |
| 2013/0141542 A1 | * | 6/2013 | Tsuchiya | H04N 13/204 348/46 |
| 2013/0245945 A1 | * | 9/2013 | Morita | G08G 1/09675 701/533 |

(Continued)

FOREIGN PATENT DOCUMENTS

| | | |
|---|---|---|
| CN | 103927904 | 7/2014 |
| CN | 110667878 | 1/2020 |

(Continued)

*Primary Examiner* — Muhammad Adnan

(57) ABSTRACT

A notification device is provided which decreases notifications that passengers find annoying. This notification device is provided with: a notification unit which detects an object that is approaching the vehicle and notifies a passenger of the approach of said object; a water detection unit which detects water present around the vehicle; and a notification control unit which controls the notification unit such that in the case that water has been detected by the water detection unit, the frequency of notifications is suppressed more than in the case that water is not detected.

8 Claims, 2 Drawing Sheets

(56) References Cited

U.S. PATENT DOCUMENTS

| | | | | |
|---|---|---|---|---|
| 2014/0318159 A1* | 10/2014 | Eisenhour | ............ | B60H 1/3211 |
| | | | | 62/89 |
| 2015/0016000 A1* | 1/2015 | Quirk | ..................... | H02H 5/083 |
| | | | | 361/78 |
| 2015/0025784 A1* | 1/2015 | Kastner | ............. | B60W 30/0956 |
| | | | | 701/119 |
| 2015/0186733 A1* | 7/2015 | Hayakawa | ............. | G06V 20/58 |
| | | | | 382/103 |
| 2017/0154228 A1* | 6/2017 | Moritani | ................ | B60K 37/06 |
| 2018/0143304 A1* | 5/2018 | Rosenzweig | ........... | G01S 17/10 |
| 2020/0010190 A1 | 1/2020 | Konishi et al. | | |
| 2020/0149919 A1* | 5/2020 | Sakurada | ............... | G06V 20/56 |

FOREIGN PATENT DOCUMENTS

| | | |
|---|---|---|
| JP | 2004-199615 | 6/2004 |
| JP | 2005-030914 | 2/2005 |
| JP | 2011-060113 | 3/2011 |
| JP | 2016-114398 | 6/2016 |
| JP | 2018-206214 | 12/2018 |
| JP | 2019-046251 | 3/2019 |

* cited by examiner

NOTIFICATION DEVICE

TECHNICAL FIELD

The present disclosure relates to a notification apparatus.

BACKGROUND ART

In the related art, a blind spot monitor (BSM) or other notification apparatus that detects objects approaching a vehicle by transmitting, for example, millimeter wave radar around the vehicle and notifies passengers in the vehicle of the approach of the object has been in practical use. Here, the presence of moisture around the vehicle due to rainfall or other factors may reduce the accuracy of object detection.

In view of this, as a technology to improve the detection accuracy of objects, for example, PTL 1 discloses an object detection apparatus that improves the detection accuracy of objects by reducing the influence of the wiper and raindrops.

CITATION LIST

Patent Literature

PTL 1
Japanese Patent Application Laid-Open No. 2016-114398

SUMMARY OF INVENTION

Technical Problem

However, if an object detection apparatus disclosed in PTL 1 mistakenly detects rain as an object, the apparatus may notify passengers of the object's approach over the duration of the rainfall, and passengers may find the notification annoying.

An object of the present disclosure is to provide a notification apparatus that reduces the notification that is bothersome to the passenger.

Solution to Problem

A notification apparatus according to the present disclosure includes: a notification part configured to detect an object approaching a vehicle and provide a notification of approach of the object to a passenger; a moisture detection part configured to detect moisture around the vehicle; and a notification control part configured to control the notification part so as to suppress a level of the notification when the moisture is detected by the moisture detection part than when the moisture is not detected.

Advantageous Effects of Invention

According to the present disclosure, the notification that is bothersome to the passenger can be reduced.

DESCRIPTION OF EMBODIMENTS

Embodiments according to the present disclosure are described below with reference to accompanying drawings.

Embodiment 1

Figure 1:
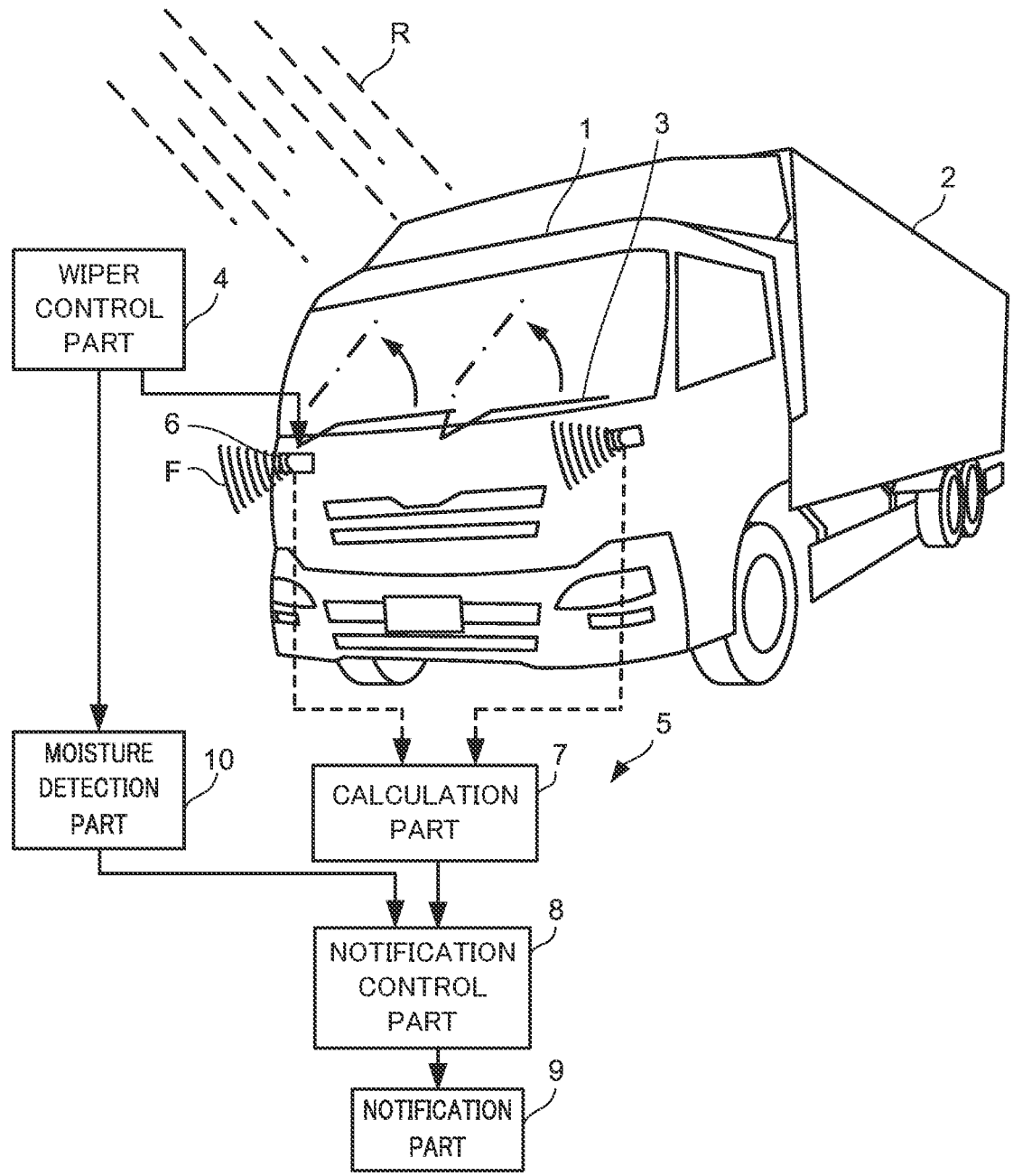
FIG. 1 is a diagram illustrating a configuration of a vehicle including a notification apparatus according to Embodiment 1 of the present disclosure.

FIG. 1 is a diagram illustrating a configuration of a vehicle including a notification apparatus according to Embodiment 1 of the present disclosure. The vehicle includes cabin 1, loading part 2, wiper 3, wiper control part 4, and notification apparatus 5. Examples of the vehicle include a commercial vehicle such as a truck.

Cabin 1 is configured for passengers to board, and disposed in the front part of the vehicle. At the driver's seat in cabin 1, an operation part for operating each part of the vehicle is disposed, and for example, a wiper operation part for operating wiper 3 is disposed. Loading part 2 is configured to carry load, and is disposed at the rear of the vehicle relative to cabin 1, for example. Loading part 2 is formed in a shape that is long in the vehicle front-rear direction so as to extend from the vicinity of the rear part of cabin 1 to the vehicle rear part.

Wiper 3 is configured to wipe off rain R adhered to the windshield of the vehicle, and is disposed to operate along the windshield. Wiper control part 4 is connected to wiper 3, and controls the operation of wiper 3 on the basis of the operation signal of the wiper operation part provided in the driver's seat in cabin 1.

Notification apparatus 5 includes a pair of detection parts 6 disposed in the front part of cabin 1, and calculation part 7, notification control part 8 and notification part 9 are sequentially connected to the pair of detection parts 6. In addition, notification apparatus 5 includes moisture detection part 10 connected to wiper control part 4, and this moisture detection part 10 is connected to notification control part 8. Notification apparatus 5 may be composed of a blind spot monitor, for example.

Detection part 6 is configured to detect an object located around the vehicle, and is disposed in the vicinity of the right side part and the vicinity of the left side part in the front part of cabin 1. Detection part 6 may be composed of a millimeter-wave radar that detects an object by transmitting and receiving millimeter waves, for example. Detection part 6 includes a detection surface facing the vehicle front side, transmits and receives millimeter wave F from the detection surface, and detects the object present in the detection range extending in the front of the detection surface. Detection part 6 is formed to have the detection range of 150 degrees in front of the detection surface, for example.

Calculation part 7 calculates the position of the object on the basis of the detection information of detection part 6. Then, calculation part 7 determines whether the position of the object is less than or equal to a predetermined distance from the vehicle, and when it is less than or equal to the predetermined distance, it outputs an approach signal to notification control part 8.

Moisture detection part 10 acquires operation information of wiper 3 from wiper control part 4, and detects rain R falling around the vehicle on the basis of the presence or absence of the operation of wiper 3. That is, moisture detection part 10 determines that rain R is detected when wiper 3 is being operated, and moisture detection part 10 determines that rain R is not detected when wiper 3 is not being operated.

Notification control part 8 controls notification part 9 so as to provide a notification of the approach of the object on the basis of the approach signal output from calculation part 7. Here, when rain R is detected at moisture detection part 10, notification control part 8 controls notification part 9 so as to suppress the level of the notification than when no rain R is detected. That is, even when an approach signal is input from calculation part 7, the level of the notification is suppressed in the case where rain R is detected at moisture detection part 10. Notification part 9 is disposed in the vehicle interior of cabin 1, and provides the notification of the approach of the object to the passenger in cabin 1 under the control of notification control part 8.

Note that the function of notification apparatus 5 can also be implemented with a computer program. For example, the reading apparatus of the computer reads a program for implementing the function of notification apparatus 5 from a recording medium in which the program is recorded, and stores it in the storage apparatus. Then, the CPU copies, in the RAM, the program stored in the storage apparatus, sequentially reads the command included in the program from the RAM and executes it, and thus, the function of notification apparatus 5 can be achieved.

Next, an operation of Embodiment 1 is described.

First, as illustrated in FIG. 1, the driver operates the vehicle by operating the operation part. At this time, the driver operates the wiper operation part not illustrated in the drawing so as to stop wiper 3 when there is no rain R falling and to operate wiper 3 when there is rain R falling. This operation signal is input to wiper control part 4, and wiper control part 4 operates wiper 3 on the basis of the operation signal.

In addition, wiper control part 4 outputs, to moisture detection part 10, operation information indicating that wiper 3 is operated. Then, moisture detection part 10 determines the presence/absence of the operation of wiper 3 on the basis of the operation information input from wiper control part 4. Moisture detection part 10 determines that rain R is not detected around the vehicle when wiper 3 is not being operated, whereas moisture detection part 10 determines that rain R has been detected around the vehicle when wiper 3 is being operated.

Here, it is preferable that moisture detection part 10 determine that wiper 3 is operated when wiper 3 is operated continuously for a predetermined period or longer. For example, moisture detection part 10 may determine that wiper 3 is operated when wiper 3 is operated continuously for approximately 10 seconds or longer. In this manner, for example, when the driver of the vehicle performs so-called window washer operation, which is an operation of washing the windshield by jetting washer fluid and operating wiper 3 for only a short time, it is possible to prevent moisture detection part 10 from erroneously determining that it has detected rain R. Thus, rain R can be reliably detected with moisture detection part 10.

In addition, moisture detection part 10 detects rain R on the basis of the presence or absence of the operation of wiper 3, and thus rain R can be reliably detected in comparison with a configuration of mechanically detecting rain R with only a capacitance sensor or the like, for example. In this manner, when detecting rain R, moisture detection part 10 outputs the detection result to notification control part 8.

On the other hand, detection part 6 transmits and receives millimeter wave F, and its reception signal is output to calculation part 7. At this time, when an object is present around the vehicle, millimeter wave F reflected by the object is received by detection part 6 in a short time, and a reception signal including the detection information of the object is output to calculation part 7.

Calculation part 7 acquires detection information from the reception signal sequentially output from detection part 6, and calculates the position of the object with respect to the vehicle on the basis of the detection information. Subsequently, calculation part 7 determines whether the position of the object is less than or equal to a predetermined distance from the vehicle, and when it is equal to or smaller than the predetermined distance, it is determined that an object is approaching the vehicle, and, an approach signal is output to notification control part 8.

Subsequently, when the approach signal indicating the approach of the object is input from calculation part 7, notification control part 8 controls notification part 9 on the basis of the detection result of rain R of moisture detection part 10. More specifically, when no rain R is detected at moisture detection part 10, notification control part 8 controls notification part 9 so as to provide the notification at the normal degree without changing the level of the notification for the passenger. This allows the passenger to recognize the approaching object and stop the vehicle, etc., to prevent the object from colliding with the vehicle.

On the other hand, when rain R is detected at moisture detection part 10, notification control part 8 controls notification part 9 so as to suppress the level of the notification for the passenger than when no rain R is detected.

In general, when there is rain R falling around the vehicle, the detection accuracy of detection part 6 tends to decrease to a certain degree, and there is a risk of detecting rain R as an object. In the related art, when the detection part detects an object, the notification of the approach of the object is provided to the passenger also when there is rain R falling around the vehicle as when there is no rain R falling. As such, when the detection part erroneously detects rain R as an object, there is a risk of providing the notification to the passenger even though there is no object while there is rain R falling.

In view of this, when rain R is detected at moisture detection part 10, notification control part 8 suppresses the level of the notification for the passenger. In this manner, the passenger's annoyance can be reduced by suppressing a situation where the notification based on the detection error is provided over a long period of rain R when detection part 6 erroneously detects rain R as the object.

Here, for example, in the case where notification part 9 provides the notification in the form of speaker sound and lamp light, notification control part 8 may control notification part 9 so as to reduce the volume of the speaker and the light quantity of the lamp to a predetermined degree. In addition, notification control part 8 may control notification part 9 so as to suppress the notification by performing only the notification of the lamp and stopping the notification of the speaker. In addition, notification control part 8 may suppress the notification by stopping all notifications.

In addition, notification control part 8 may control notification part 9 so as to suppress the level of the notification stepwise as the time elapses from the time point when rain R is detected at moisture detection part 10. In this manner, while the notification of the approach of the object is provided to the passenger with the first notification, the passenger's annoyance can be reduced by suppressing the notification of long periods of time due to rain R.

In addition, notification control part 8 can control notification part 9 so as to suppress the level of the notification in accordance with the amount of rain R. For example, moisture detection part 10 calculates the amount of rain R on the basis of the operation information of wiper 3 output from wiper control part 4. Then, when the amount of rain R is large, notification control part 8 controls notification part 9 so as to largely suppress the level of the notification than when the amount of rain R is small. In this manner, the notification that is highly likely to be bothersome to passengers can be reliably reduced.

Subsequently, when rain R stops, the driver operating the vehicle operates the wiper operation part not illustrated so as to stop wiper 3. This operation signal is input to wiper control part 4, and wiper control part 4 stops wiper 3 on the basis of the operation signal. At this time, wiper control part 4 stops wiper 3 while at the same time outputs, to moisture detection part 10, operation information representing the stop of the operation of wiper 3. Then, moisture detection part 10 determines that the operation of wiper 3 is stopped, i.e., no rain R is detected on the basis of the operation information input from wiper control part 4. Moisture detection part 10 outputs, to notification control part 8, the detection result indicating that no rain R is detected around the vehicle.

When the detection result indicating that no rain R is detected is input from moisture detection part 10, notification control part 8 controls notification part 9 so as to release the suppression of the notification i.e., so as to provide the notification at the normal degree.

At this time, it is preferable that notification control part 8 control notification part 9 so as to release the suppression of the notification when rain R is not detected continuously for a predetermined time or longer at moisture detection part 10. For example, notification control part 8 can release the suppression of the notification when no rain R is not detected continuously for approximately 10 minutes or longer at moisture detection part 10. In this manner, the suppression of the notification can be released after rain R can be reliably stopped, and the passenger's annoyance situation where the suppression of notification and its release operation are repeated each time rain R starts to fall again can be reliably suppressed.

According to the present embodiment, when rain R is detected at moisture detection part 10, notification control part 8 controls notification part 9 so as to suppress the level of the notification than when no rain R is detected. Thus, a situation where the notification based on the detection error is continuously provided over a long period of rain R can be suppressed, and the notification that is bothersome to the passenger can be reduced.

Embodiment 2

Embodiment 2 of the present disclosure is described below. Here, differences from the above-described Embodiment 1 are mainly described, and the points common to the above-described Embodiment 1 are denoted with the same reference numerals and, the description thereof is omitted.

Figure 2:
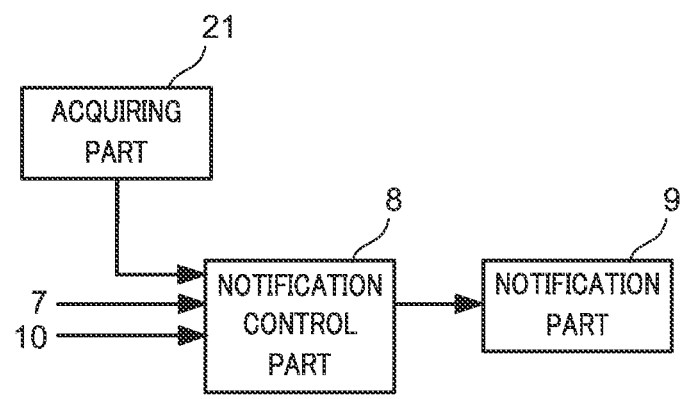
FIG. 2 is a block diagram illustrating a main part of a notification apparatus according to Embodiment 2.

In the above-described Embodiment 1, notification control part 8 may control notification part 9 so as to release the suppression of the notification when the vehicle travels through a tunnel. For example, as illustrated in FIG. 2, acquiring part 21 may be additionally disposed in Embodiment 1.

Acquiring part 21 acquires the road information of the road where the vehicle travels, and may be composed of a camera that captures the image of the vehicle front side, for example. Acquiring part 21 may be disposed in the front part of cabin 1 at a center portion in the vehicle width direction.

After suppressing the level of the notification of notification part 9 on the basis of the detection result indicating that rain R has been detected, notification control part 8 determines whether the vehicle travels through a tunnel on the basis of the road information acquired at acquiring part 21. Then, when it is determined that the vehicle travels through a tunnel, notification control part 8 controls notification part 9 so as to release the suppression of the notification. Note that notification control part 8 is not limited to the determination based on the captured-image information captured by the camera, and may determine whether the vehicle travels through a tunnel on the basis of road information such as map information, for example.

With this configuration, acquiring part 21 acquires road information by capturing the road where the vehicle is travelling, and sequentially outputs the road information to notification control part 8. At this time, it is assumed that rain R is falling around the vehicle, and that the notification of notification part 9 is suppressed by notification control part 8.

Notification control part 8 detects the tunnel from the road information output from acquiring part 21, i.e., the captured image. When detecting a tunnel from the captured image, notification control part 8 determines that the vehicle travels through a tunnel, and controls notification part 9 so as to release the suppression of the notification. When the vehicle travels through a tunnel, detection part 6 is not influenced by rain R, and therefore the notification of an object approaching vehicle can be reliably provided by releasing the suppression of the notification by notification control part 8.

In Embodiment 1, notification control part 8 releases the suppression of the notification when rain R is not detected continuously for a predetermined time or longer at moisture detection part 10, but when it is determined that the vehicle travels through a tunnel, notification part 9 can be controlled so as to release the suppression of the notification in a time shorter than the predetermined time after rain R has not been detected at moisture detection part 10. For example, notification control part 8 can release the suppression of the notification after approximately five seconds after rain R has not been detected at moisture detection part 10. In this manner, the notification of the object approaching vehicle can be more reliably provided.

Note that while acquiring part 21 is composed of a camera in the present embodiment, the present invention is not limited to this as long as the road information of the road where the vehicle travels can be acquired. For example, acquiring part 21 may be composed of an information communication part that acquires road information stored in a server or the like through communication, an inter-vehicle communication part that performs inter-vehicle communication, a road-vehicle communication part that performs road-vehicle communication and the like.

In addition, while notification control part 8 determines whether the vehicle travels through a tunnel before it reaches the tunnel on the basis of the road information acquired at acquiring part 21 in the present embodiment, the present invention is not limited to this as long as whether the vehicle travels through a tunnel can be determined based on the road information. For example, notification control part 8 may determine that the vehicle travels through a tunnel at the time point when rain R is not detected at moisture detection part 10 after detecting the tunnel on the basis of the road information acquired at acquiring part 21. In addition, notification control part 8 may determine that the vehicle travels through a tunnel on the basis of the map information acquired at acquiring part 21 at the time point when the vehicle has reached the tunnel. In this manner, it is possible to prevent a situation where the suppression of the notification is released before the vehicle reaches the tunnel in the case where it takes a time before the vehicle reaches the tunnel due to traffic congestion and the like, and the suppression of the notification can be released after the vehicle reliably reached the tunnel.

According to the present embodiment, notification control part 8 controls notification part 9 so as to release the suppression of the detection when it is determined that the vehicle travels through a tunnel, and thus can reliably provide the notification of an object approaching vehicle in a situation where it is not affected by rain R.

Note that while moisture detection part 10 detects rain R on the basis of the presence or absence of the operation of wiper 3 in the above-described Embodiments 1 and 2, the present invention is not limited to this as long as rain R can be detected. For example, moisture detection part 10 may be configured to mechanically detect rain R in a capacitive, optical and the like manner.

In addition, while moisture detection part 10 detects rain R falling around the vehicle in the above-described Embodiments 1 and 2, it is not limited to rain R as long as the moisture around vehicle can be detected. For example, moisture detection part 10 may detect fog, snow and the like around the vehicle.

In addition, in the above-described Embodiments 1 and 2, moisture detection part 10 may further detect the direction of rain R with respect to the vehicle. For example, two moisture detection parts 10 are disposed on the right side part and the left side part of the vehicle, and the direction of rain R is detected on the basis of their detected amounts. Then, notification control part 8 controls notification part 9 on the basis of the direction of rain R detected at moisture detection part 10. That is, notification control part 8 may perform control such that the level of the notification of notification part 9 is suppressed only when an approach of an object is detected at detection part 6 disposed in the direction of rain R, and that the level of the notification of notification part 9 is not suppressed when an approach of an object is detected at detection part 6 disposed on the opposite side. In this manner, only the notification that is bothersome to the passenger can be reliably reduced.

Figure 3:
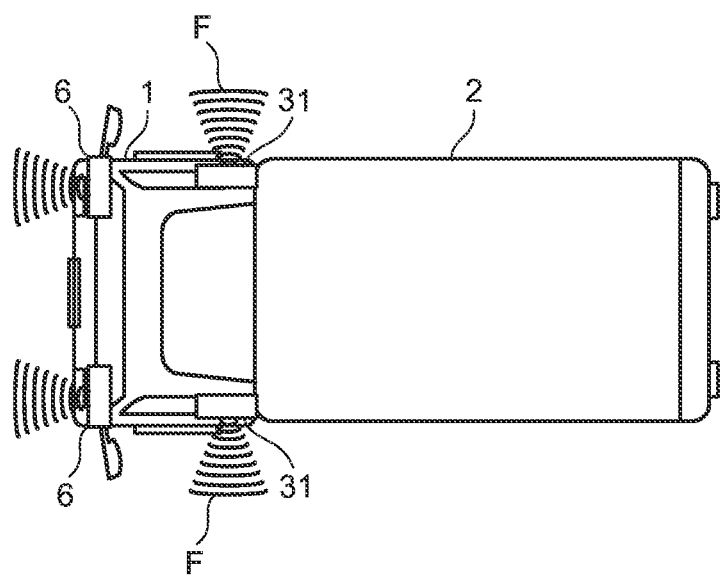
FIG. 3 is a diagram illustrating a configuration of a modification of Embodiments 1 and 2.

In addition, while detection part 6 is disposed in the vicinity of the right side part and the vicinity of left side part in the front part of cabin 1 in the above-described Embodiments 1 and 2, the present invention is not limited to this as long as an object approaching a vehicle can be detected. In addition, one detection part 6 may be disposed, and three or more detection parts 6 may be disposed. For example, as illustrated in FIG. 3, a pair of detection parts 31 may be additionally disposed separately from the pair of detection parts 6 of Embodiment 1. The pair of detection parts 31 has a configuration similar to that of detection part 6, and is disposed in the vicinity of the right side part and the vicinity of the left side part in the rear part of cabin 1. Detection part 31 includes a detection surface facing the right lateral side and the left lateral side of the vehicle, transmits and receives millimeter wave F from the detection surface, and detects the object present in the detection range extending in the front of the detection surface. In this manner, objects can be detected in a wide range from the vehicle front side to the vehicle lateral side.

In addition, while detection part 6 is composed of a millimeter-wave radar in the above-described Embodiments 1 and 2, the present invention is not limited to this as long as an object approaching a vehicle can be detected. For example, detection part 6 may be composed of an ultrasound sensor, a laser radar, a camera, or the like. It should be noted that detection part 6 is preferably composed of a millimeter-wave radar from a view point of rectilinearity and the like.

In addition, while loading part 2 is disposed to carry a load in the above-described Embodiments 1 and 2, the present invention is not limited to this as long as it is disposed at the rear of the vehicle relative to cabin 1.

The above-mentioned embodiments are merely examples of embodiments for implementing the invention, and the technical scope of the invention should not be interpreted as limited by these embodiments. In other words, the invention can be implemented in various forms without deviating from its gist or its main features. For example, the disclosure of the shape and number of each part described in the above form is only an example and can be changed and implemented as appropriate.

This application is entitled to and claims the benefit of Japanese Patent Application No. 2020-013522 filed on Jan. 30, 2020, the disclosure each of which including the specification, drawings and abstract is incorporated herein by reference in its entirety.

INDUSTRIAL APPLICABILITY

The notification apparatus according to the present disclosure can be used for an apparatus that detects an object approaching a vehicle and provides the notification of the approach of the object to the passenger.

REFERENCE SIGNS LIST

1 Cabin
2 Loading part
3 Wiper
4 Wiper control part
5 Notification apparatus
6, 31 Detection part
7 Calculation part
8 Notification control part
9 Notification part
10 Moisture detection part
21 Acquiring part
F Millimeter wave
R Rain

The invention claimed is:

1. A notification apparatus comprising:
a notification part configured to detect an object approaching a vehicle and provide a notification of approach of the object to a passenger;
a moisture detection circuit configured to detect moisture around the vehicle based on an operation signal of a wiper or a detection signal of a sensor; and
a notification control circuit that controls the notification part so as to suppress a level of the notification when the moisture is detected by the moisture detection circuit than when the moisture is not detected, wherein
when the vehicle travels through a tunnel after suppressing the level of the notification of the notification part, the notification control circuit controls the notification part so as to release suppression of the notification.

2. The notification apparatus according to claim 1, wherein the moisture detection circuit is connected to the wiper configured to remove moisture adhered to the vehicle, and the moisture detection circuit detects the moisture around the vehicle on a basis of presence/absence of operation of the wiper.

3. The notification apparatus according to claim 2, wherein the moisture detection circuit determines that the wiper is operated when the wiper is operated continuously for a predetermined period or longer.

4. The notification apparatus according to claim 1, wherein when the moisture is not detected continuously for a predetermined time or longer at the moisture detection circuit after the level of the notification of the notification part is suppressed, the notification control circuit controls the notification part so as to release suppression of the notification.

5. The notification apparatus according to claim 4, wherein when it is determined that the vehicle travels through a tunnel, the notification control circuit controls the notification part so as to release the suppression of the notification in a time shorter than the predetermined time after the moisture is no longer detected by the moisture detection circuit.

6. The notification apparatus according to claim 1, wherein the notification control circuit controls the notification part to release the suppression of the notification when the notification control circuit determines that the vehicle travels through the tunnel, even when the moisture detection circuit detects the moisture.

7. The notification apparatus according to claim 1, further comprising an imaging device capturing images of a front side of the vehicle to acquire road information of a road where the vehicle travels, and
the notification control circuit determines whether or not the vehicle travels through the tunnel based on the road information captured by the imaging device.

8. The notification apparatus according to claim 1, further comprising a communication part receiving road information of a road where the vehicle travels, and
the notification control circuit determines whether or not the vehicle travels through the tunnel based on the road information.

\* \* \* \* \*